(12) United States Patent
Artelsmair

(10) Patent No.: US 9,035,218 B2
(45) Date of Patent: May 19, 2015

(54) METHOD FOR SHORT-ARC WELDING AND WELDING DEVICE FOR SHORT-ARC WELDING

(75) Inventor: Josef Artelsmair, Wartberg (AT)

(73) Assignee: Fronius International GmbH, Pettenbach (AT)

(*) Notice: Subject to any disclaimer, the term of this patent is extended or adjusted under 35 U.S.C. 154(b) by 709 days.

(21) Appl. No.: 13/389,064

(22) PCT Filed: Jul. 23, 2010

(86) PCT No.: PCT/AT2010/000272
§ 371 (c)(1),
(2), (4) Date: Feb. 6, 2012

(87) PCT Pub. No.: WO2011/017725
PCT Pub. Date: Feb. 17, 2011

(65) Prior Publication Data
US 2012/0132632 A1    May 31, 2012

(30) Foreign Application Priority Data
Aug. 10, 2009  (AT) ............................... A 1260/2009

(51) Int. Cl.
*B23K 9/10*    (2006.01)
*B23K 9/09*    (2006.01)
*B23K 9/095*   (2006.01)

(52) U.S. Cl.
CPC ............... *B23K 9/092* (2013.01); *B23K 9/0953* (2013.01)

(58) Field of Classification Search
CPC ............................. B23K 9/0953; B23K 9/092

USPC ............ 219/130.21, 130.31, 130.32, 130.33, 219/130.4, 130.5, 130.51
See application file for complete search history.

(56) References Cited

U.S. PATENT DOCUMENTS 3,423,564 A *  1/1969  Sevenco ................... 219/130.21
3,809,853 A    5/1974  Manz
(Continued)

FOREIGN PATENT DOCUMENTS

CA        1004734 A1    2/1977
CA        131 39 02     2/1993
(Continued)

OTHER PUBLICATIONS

Chinese Office Action dated Jan. 16, 2014 in Chinese Application No. 201080035104.6 with English Translation of relevant parts.
(Continued)

*Primary Examiner* — Jianying Atkisson
(74) *Attorney, Agent, or Firm* — Collard & Roe, P.C.

(57) ABSTRACT

The invention relates to a method for disconnecting a short circuit (30) during short-arc welding, wherein when a short circuit (30) occurs, a time frame (32) is started, in which a defined current profile is performed to disconnect the short circuit within the time frame (32), and the current is increased if the time frame (32) is exceeded, and a corresponding welding device (1). In order to improve the welding quality, after the specifiable time frame (32) expires during a short circuit (30), said current profile for disconnecting the short circuit (30) is detected and at least one value or parameter in the disconnection of the short circuit (30) is stored or saved, wherein at least one value or parameter in the time frame (32) of the following short circuit (30) is adapted according to the stored value or parameter.

11 Claims, 5 Drawing Sheets

(56) References Cited

U.S. PATENT DOCUMENTS

| | | | |
|---|---|---|---|
| 4,546,234 A * | 10/1985 | Ogasawara et al. ..... | 219/137 PS |
| 4,866,247 A | 9/1989 | Parks et al. | |
| 6,969,823 B2 | 11/2005 | Huismann et al. | |
| 7,351,933 B2 | 4/2008 | Huismann et al. | |
| 2003/0111452 A1 | 6/2003 | Ihde | |
| 2005/0056629 A1 | 3/2005 | Huismann et al. | |
| 2005/0224481 A1 | 10/2005 | Nadzam et al. | |
| 2006/0283847 A1 | 12/2006 | Kawamoto et al. | |
| 2008/0006612 A1 | 1/2008 | Peters et al. | |
| 2008/0006616 A1 | 1/2008 | Hutchison et al. | |
| 2008/0149610 A1 | 6/2008 | Huismann et al. | |

FOREIGN PATENT DOCUMENTS

| | | |
|---|---|---|
| CA | 1313902 C | 2/1993 |
| CA | 2 695 215 | 4/2009 |
| CN | 1478629 A | 3/2004 |
| DE | 23 42 710 | 3/1974 |
| EP | 0 324 960 | 7/1989 |
| JP | S49-065355 A | 6/1974 |
| JP | S50-112245 A | 9/1975 |
| JP | S60-064774 A | 4/1985 |
| JP | H01-162573 A | 6/1989 |
| JP | H02-160172 A | 6/1990 |
| JP | H03-066473 A | 3/1991 |
| JP | H09-271941 A | 10/1997 |
| WO | WO 2008/137371 | 11/2008 |
| WO | WO 2009/040620 | 4/2009 |

OTHER PUBLICATIONS

International Search Report of PCT/AT2010/000272, date of mailing Nov. 19, 2010.
International Preliminary Report on Patentability of PCT/AT2010/000272 and Written Opinion of the International Searching Authority dated Feb. 14, 2012.
Austrian Office Action in A 1260/2009 dated May 31, 2010 (w/ Eng. transl. of relevant parts).
Japanese Office Action dated Jun. 11, 2013 in Japanese Patent Application No. 2012-524047 with English translation.

* cited by examiner

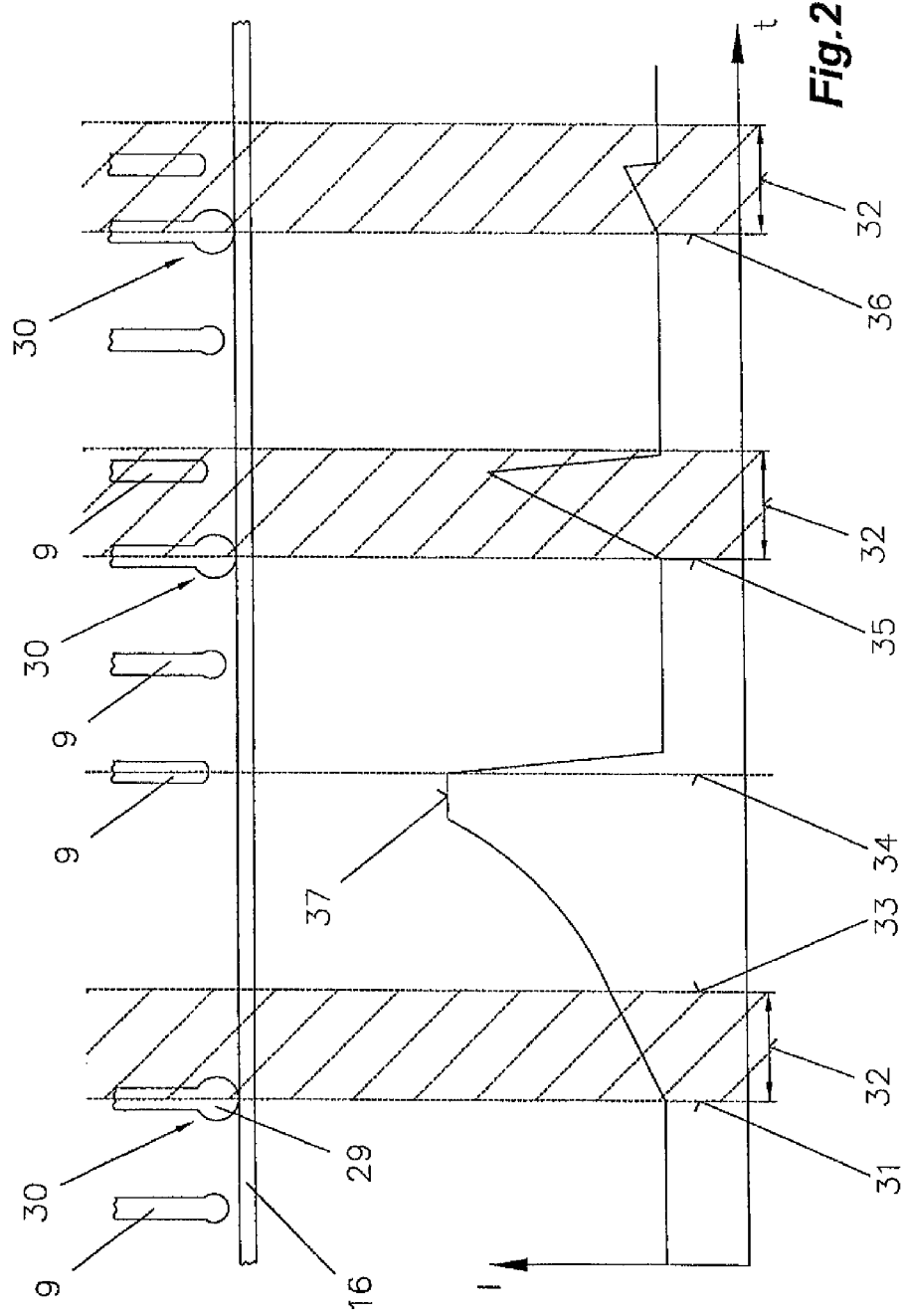

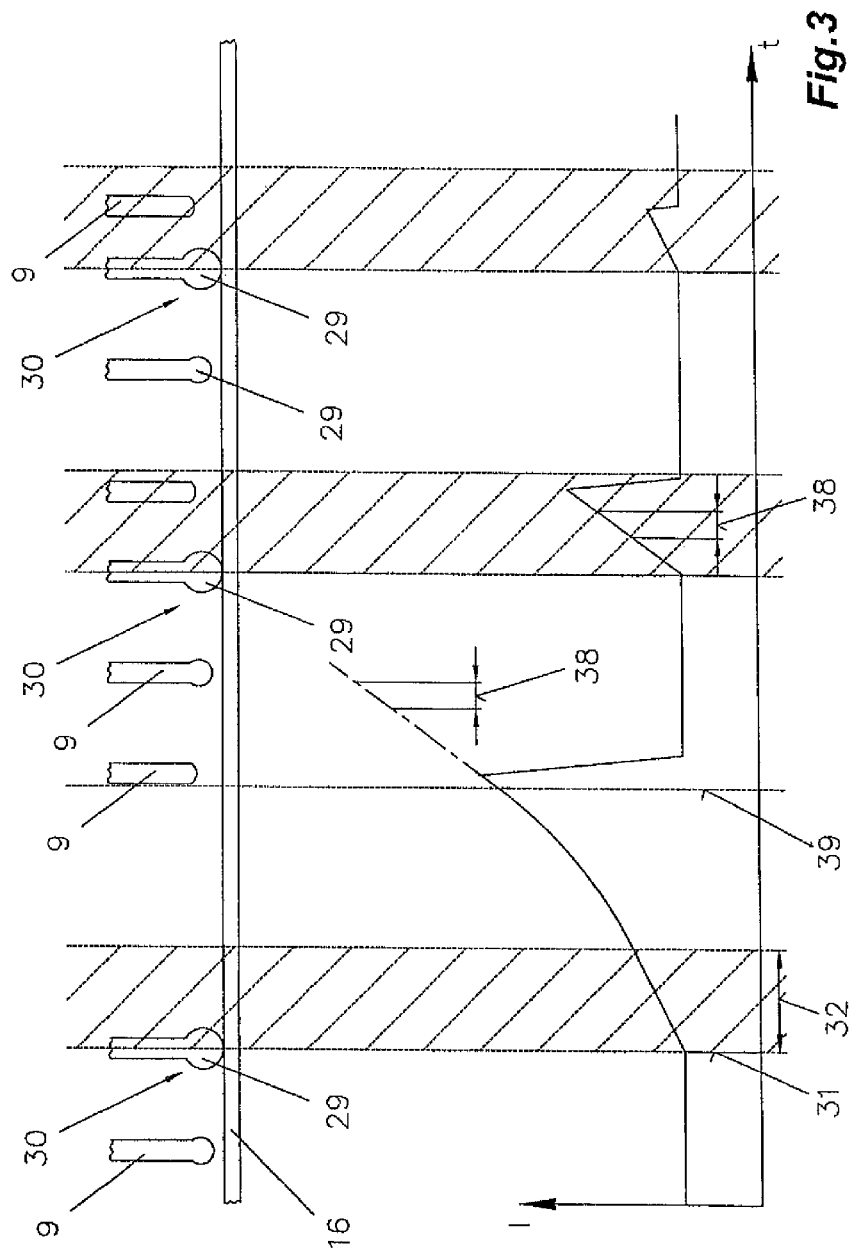

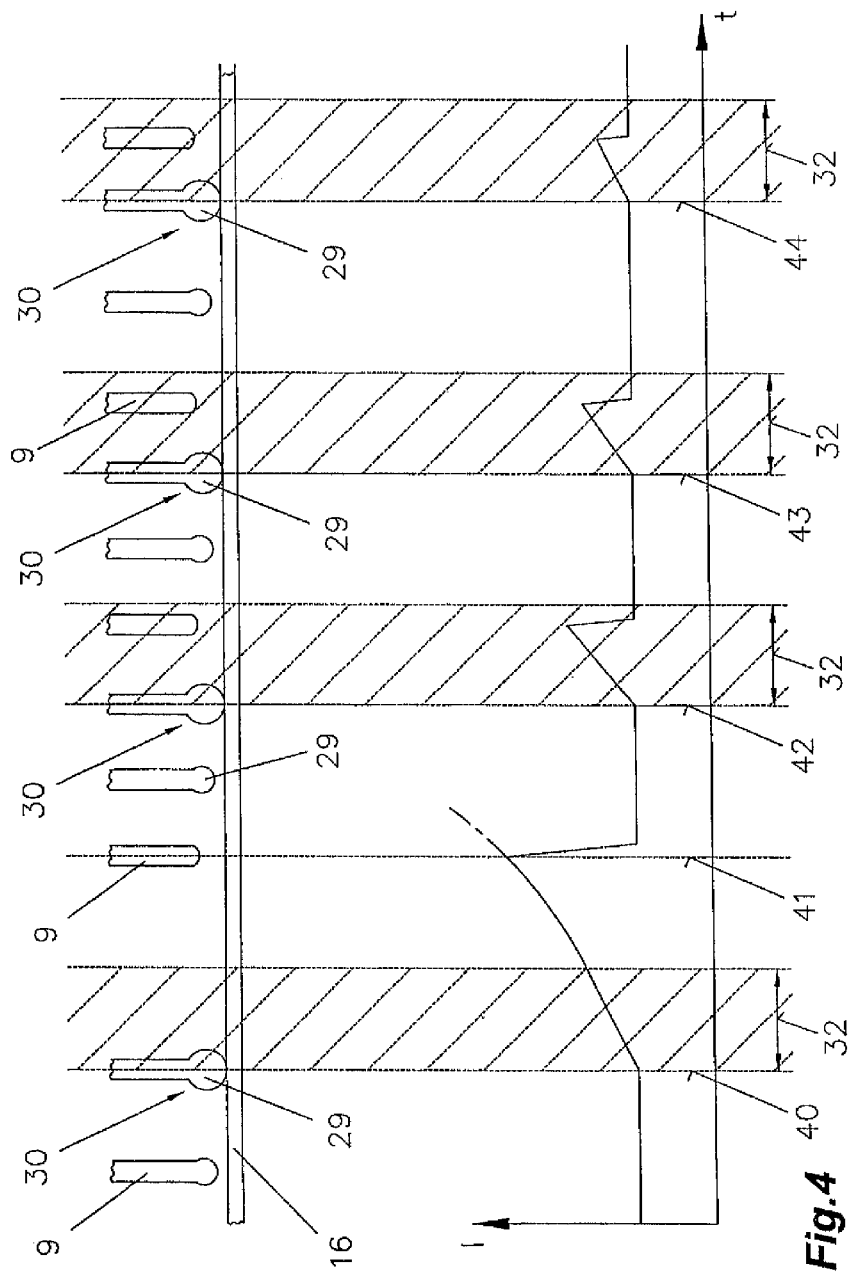

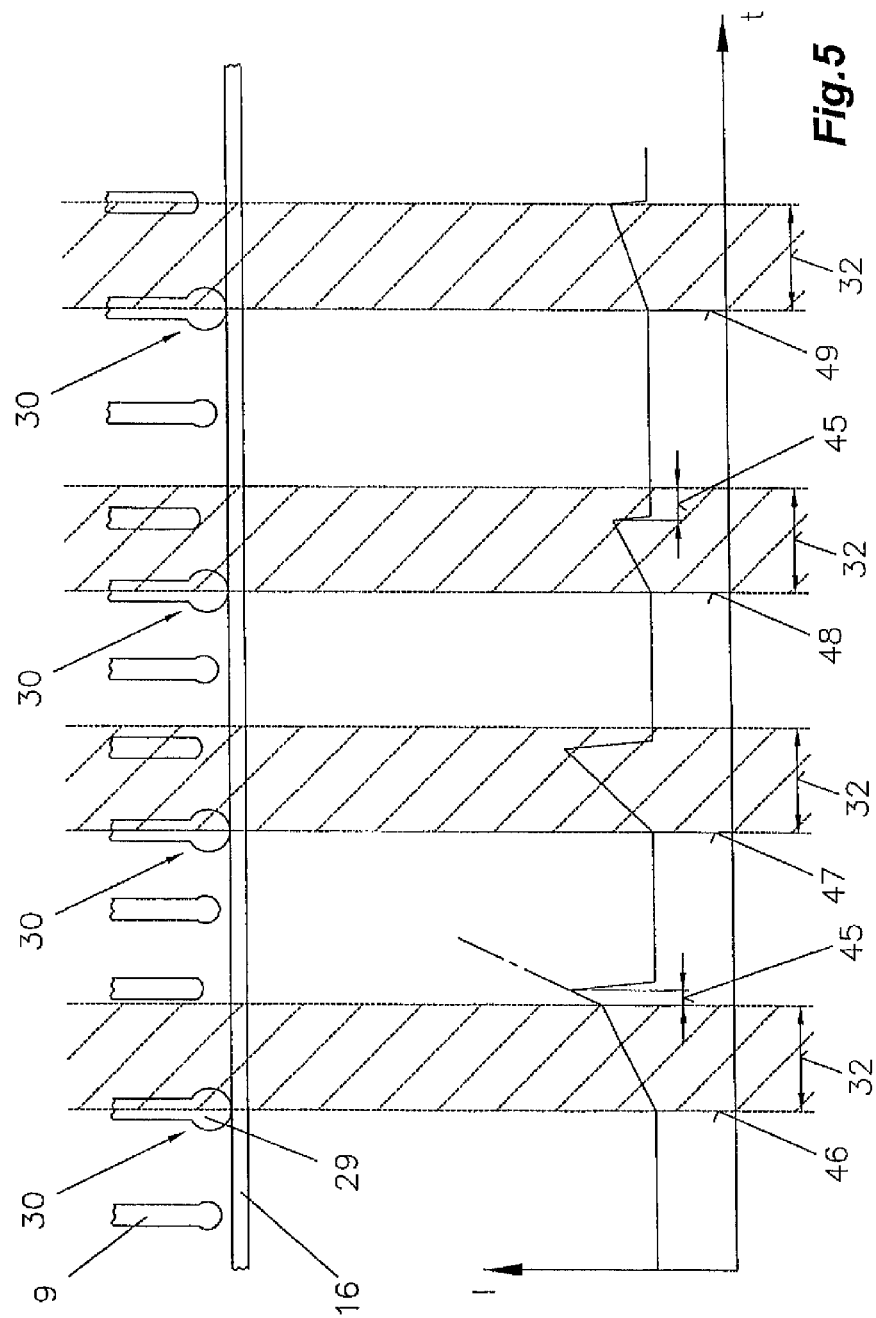

METHOD FOR SHORT-ARC WELDING AND WELDING DEVICE FOR SHORT-ARC WELDING

CROSS REFERENCE TO RELATED APPLICATIONS

This application is the National Stage of PCT/AT2010/000272 filed on Jul. 23, 2010, which claims priority under 35 U.S.C. §119 of Austrian Application No. A 1260/2009 filed on Aug. 10, 2009, the disclosure of which is incorporated herein by reference. The international application under PCT article 21(2) was not published in English.

The invention relates to a method for disconnecting or breaking a short circuit during short-arc welding, wherein when a short circuit occurs, a time frame is started, in which a defined current profile is performed to disconnect the short circuit within the time frame, and the current is increased if the time frame is exceeded.

Furthermore the invention relates to a welding device for short-arc welding with at least one power source and a control unit, and a welding torch connected thereto.

A disadvantage of the known methods is that during any short circuit the same current profile with the same values or parameters and waveforms is performed without regard to the duration of the short circuit. As a consequence, no impact is made on the process and the welding quality can hardly be improved.

Such methods are known, for example, from WO 2008/137371 A2, WO 2009/040620 A1, EP 0 324 960 A1 or DE 23 42 710 C3.

It is the object of the present invention to create a method specified above for disconnecting or breaking a short circuit during short-arc welding and a welding device specified above to be used in this method in order to improve welding quality substantially and maintain the stability of the welding process. Drawbacks of known methods and welding devices are to be eliminated or at least reduced.

The object is achieved by a method specified above, wherein, after the specifiable time frame expires during a short circuit, the current profile for disconnecting the short circuit is detected and at least one value or parameter is stored or saved, with at least one value or parameter in the time frame of the following short circuit being adapted according to the stored value or parameter. An advantage here is that because of the active adaptation for disconnecting the short circuit, the increase in the current in the time frame may be set more flat so that a soft arc with less spatter discharge is obtained, as a flatter curve of increase when disconnecting the short circuit creates much lower pressure of the arc which leads to less material being discharged. This means that working with substantially shorter arcs is possible as well, as there is no danger of the process becoming unstable and maintaining this state, i. e. no "stuttering" occurs. This is because the process prevents this from happening by adapting the values or parameters during a new short circuit, as this leads to the short circuit being broken substantially early within the time frame, thus restoring stability.

If the current increase speed $di/dt$ for disconnecting the short circuit can be accelerated steadily, in particular exponentially, after the expiration of the time frame, the short circuit can be broken very quickly.

Another advantage is detecting the current increase speed or time when breaking the short circuit, since in this way a substantial parameter is determined and may be applied in a following time frame during a new short circuit. Here, however, even further parameters can be detected, modified or adapted.

If, in the event of a time frame expiring during the following occurring short circuit, the current within the time frame is increased according to the current increase time or speed $di/dt$ that was stored last, an adaptation is triggered within the time frame, thus enabling a faster breaking of the short circuit, thereby improving process stability.

In a measure that comprises the resetting of the values or parameters, in particular current increase time or speed, to an initial value when disconnecting a short circuit within the time frame, it is advantageous that process stability is maintained and, thus, a smooth disconnecting of the short circuit with little welding spatter can be achieved.

Another advantageous measure, however, includes progressively increasing the current increase speed up to a maximum value when the time frame expires, and maintaining this maximum value until the short circuit is disconnected, as this provides for a longer life of the components of the welding device and, at the same time, enables a reduction of manufacturing costs by an optimal selection of the dimensions. A further advantage is that this also helps to reduce welding spatter, as only a certain maximum current is applied when disconnecting the short circuit, so the pressure of the arc may be observed accordingly during the breaking.

Further advantageous measures include modifying the current increase speed within the time frame when a previous short circuit has been maintained throughout the time frame, with the current increase speed of the presently occurring short circuit being adapted to the previously completed disconnecting of a short circuit, as this leads to a faster breaking of the following short circuit, thus improving process stability substantially.

Still further advantageous measures include maintaining the current increase speed once a current increase speed $di/dt$ that can be pre-set has been achieved, as this enables achieving a very strong current and, thus, a secure disconnecting of the short circuit.

Other advantageous measures, however, comprise resetting the values or parameters over a number of time frames after exceeding a time frame, since in this way, the resetting to the initial values is effected slowly, thus guaranteeing process stability.

A further measure has the advantage that a time frame about when the short circuit will be broken is detected, whereupon corresponding modifications are done to the next time frame since in this way any desired current profile may be performed.

Moreover, the object of the invention is achieved by a welding device as specified above, the control unit of which is designed for performing the method specified above. An advantage here is that, as has already been described above, quality and stability are improved by an adaptation to the previous breaking of the short circuit, as this leads to the short circuit within the following time frame being disconnected by adapting the current profile. By adapting the current profile according to a previous disconnection process, fluctuations of a weld pool can be counteracted.

Further advantageous embodiments are described in the description. The advantages resulting from them will be understood from the description as well.

The present invention is explained in more detail by means of the accompanying schematic drawings, wherein all disclosures in the entire description may be referred to like parts with like reference numerals in an analogous manner. Furthermore, single features of the exemplary embodiment(s)

shown may also constitute individual solutions according to the invention. In the drawings:

FIG. 2 shows a schematic representation of a temporal current profile for disconnecting a short circuit during short-arc welding, with a current limitation;

FIG. 3 shows a further schematic representation of a temporal current profile for disconnecting a short circuit during short-arc welding, with a limited current increase speed;

FIG. 4 shows a different embodiment of a current profile for disconnecting a short circuit during short-arc welding, with several adaptation procedures; and FIG. 5 shows an embodiment of a current profile for disconnecting a short circuit during short-arc welding, with detecting a duration.

Figure 1:
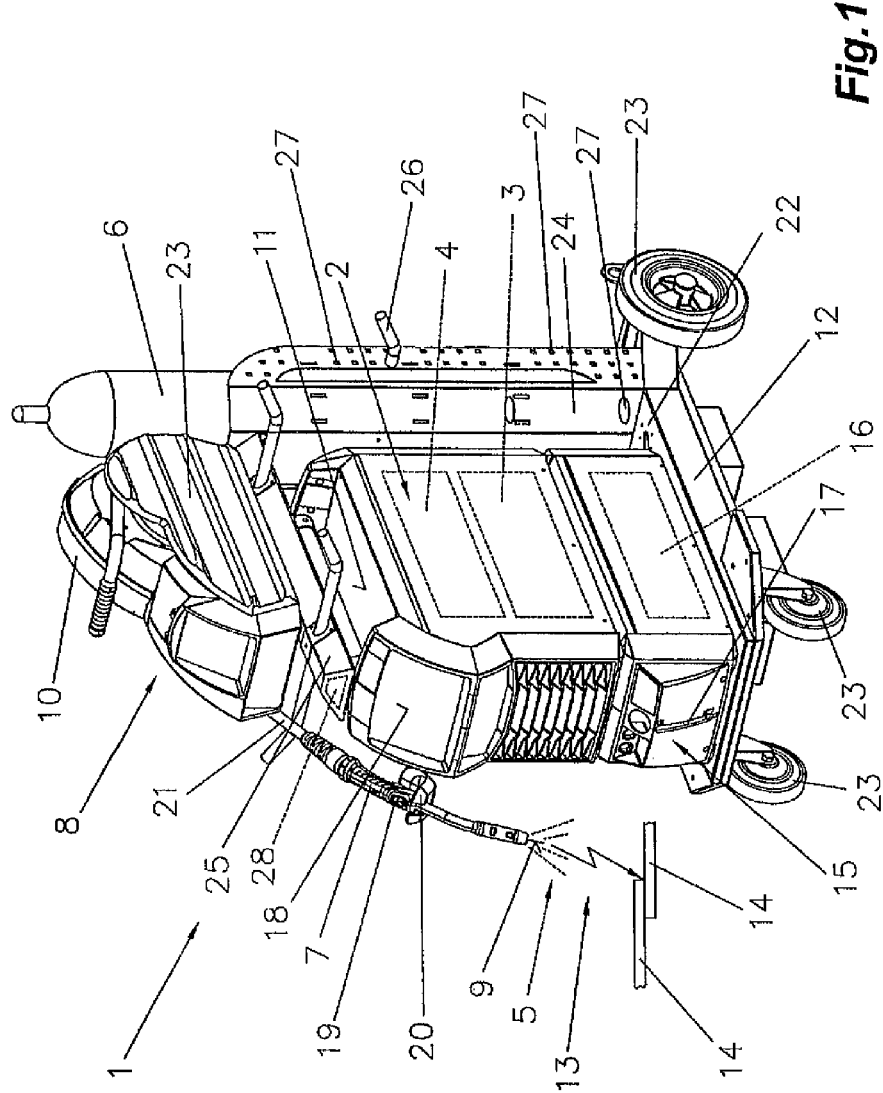
FIG. 1 shows a schematic representation of a welding machine or a welding device.

As an introduction it is noted that the figures will be described in connection and together, wherein in the different explained embodiments like reference numerals and/or like component names are used to denote like parts, and all disclosures in the entire description may be referred to like parts with like reference numerals and/or like component names in an analogous manner. Furthermore, the position information used in the description—such as top, bottom, side, etc.— refers to the directly described and illustrated figures and has to be re-interpreted to fit the new orientation if positions are changed. Similar components or components with similar functions have like reference numerals with different indexes. Moreover, single features or combinations of features of the different exemplary embodiments shown and described may also constitute individual, inventive solutions, or solutions according to the invention.

FIG. 1 shows a welding device 1 and/or a welding installation for many different processes and/or operations such as MIG/MAG welding and/or TIG welding or electrode welding, double-wire/tandem welding operations, plasma operations or brazing and soldering operations etc. The welding device 1 comprises a power source 2 with a power element 3 arranged therein, a control unit 4 and further components and wires (not shown) such as a switching member, control valves etc. The control unit 4 may be connected to a control valve that is arranged between a gas storage 6 and a (welding) torch 7 in a supply line for a gas 5, in particular a shielding gas such as $CO_2$, helium or argon and the like.

In addition, the control unit 4 may be used to control also a wire feed unit 8 as it is common for MIG/MAG welding, with an additional material and/or welding wire 9 being supplied to the region of the welding torch 7 from a supply roll 10 and/or a wire coil via a supply line. Of course it is possible for the wire feed unit 8, as it is known from the prior art, to be integrated into the welding device 1, in particular into the housing 11 of the power source 2, in contrast to being an additional device positioned on a cart 12, as illustrated in FIG. 1. This is referred to as a compact welding device 1. Here it is also possible for the wire feed unit 8 to be placed directly on top of the welding device 1, i. e. the housing 11 of the power source 2 is formed on the top surface for receiving the wire feed unit 8 so that the cart 12 can be omitted. It is further possible for the wire feed unit 8 to supply the welding wire 9 and/or the additional material outside of the welding torch 7 to the process site, in which case a non-melting electrode is preferably arranged within the welding torch 7, as is common in TIG welding.

The current for creating an arc 13, in particular a working arc, between the electrode and/or the welding wire 9 and a workpiece 14, which is preferably composed of one or more portions, is supplied from the power element 3 of the power source 2 to the welding torch 7, in particular to the electrode and/or the welding wire 9, via a welding line (not shown), with the workpiece 14 to be welded being connected to the power source 2 via a further welding line for the further potential (not shown), in particular the return lead, so that an electric circuit for a process can be created by means of the arc 13 and/or the plasma beam created. When using a torch with internal arcs 13, both welding lines (not shown) lead to the torch so that an appropriate electric circuit can be established within the torch, as may be the case with plasma torches.

For cooling the welding torch 7, the welding torch 7 may be connected to a liquid tank, in particular a water tank 16 with a level indicator 17, via a cooling device 15 and possible intermediate components such as a flow controller, wherein the cooling device 15, notably a liquid pump used for the liquid positioned within the water tank 16, will be started upon activating the welding torch 7 in order to effect a cooling of the welding torch 7. As is shown in the illustrated exemplary embodiment, the cooling device 15 is positioned on the cart 12 prior to placing the power source 2 thereon. The individual components of the welding installation, i. e. the power source 2, the wire feed unit 8 and the cooling device 15, are formed in such a way that they have respective protrusions and/or recesses so they can be stacked or placed on top of each other safely.

The welding device 1, the power source 2 in particular, further comprises an input and/or output device 18 for setting and/or retrieving and displaying all the various welding parameters, operation modes or welding programmes of the welding device 1. The welding parameters, operation modes or welding programmes that have been set by the input and/or output device 18 are communicated to the control unit 4, which then actuates the individual components of the welding installation and/or the welding device 1 and/or defines corresponding set points for regulating or controlling. Here it is also possible to perform setting procedures via the welding torch 7 when using an appropriate welding torch 7, in which case the welding torch 7 is equipped with a welding torch input and/or output device 19. In this case, the welding torch 7 is preferably connected to the welding device 1, in particular the power source 2 or the wire feed unit 8, via a data bus, in particular a serial data bus.

For starting the welding process, the welding torch 7 usually comprises a starting switch (not shown), so the arc 13 can be ignited by actuating the starting switch. In order to protect the user from the great heat radiation of the arc 13, the welding torch 7 may be equipped with a heat protection shield 20. Moreover, in the exemplary embodiment shown, the welding torch 7 is connected to the welding device 1 and/or the welding installation via a hose pack 21, said hose pack 21 being attached to the welding torch 7 by an anti-buckling means 22. In the hose pack 21, the individual lines such as the supply line and/or lines for the welding wire 9, for the gas 5, for the cooling circuit, for the data transmission etc. are arranged from the welding device 1 to the welding torch 7 while the return lead is preferably connected to the power source 2 separately. The hose pack 21 is connected to the power source 2 or the wire feed unit 8 by a coupling device (not shown), while the individual lines within the hose pack 21 are attached to or within the welding torch 7 by means of an anti-buckling means. In order to guarantee an appropriate strain relief for the hose pack 21, the hose pack 21 may be connected to the housing 11 of the power source 2 or the wire feed unit 8 via a strain relief device (not shown).

In general, it should be noted that for different welding operations and/or welding devices 1, such as TIG devices or MIG/MAG devices or plasma devices, not all components mentioned above have to be used and/or incorporated. It may, for example, be possible for the welding torch 7 to be formed as an air-cooled welding torch 7 so the cooling device 15, for example, might be omitted. As a consequence, it can be said that the welding device 1 is formed by at least the power source 2, the wire feed unit 8 and the cooling device 15, wherein these can also be arranged in a common housing 11. Furthermore, it is possible for further parts and/or components such as a drag protection 23 on the wire feed unit 8 or an optional carrier 24 on a holder 25 for the gas storage 6 etc. to be arranged and/or included.

FIGS. 2 to 5 illustrate short circuit welding processes by means of diagrams, wherein the current I is shown on the Y-axis and the time t is shown on the X-axis. A detailed description of a short circuit welding process or a short-arc welding process, in which a droplet 29 and/or a material transition is achieved by a short circuit 30 between the welding wire 9 and the weld pool and/or workpiece 16 (as schematically illustrated), is not included, as this is widely known from the prior art.

Typically, in short circuit welding, the current I will be increased when a short circuit 30 occurs—see points of time 31 in FIG. 2. Here it is possible to first lower, then increase the current I when the short circuit 30 occurs (not illustrated). As is illustrated in the diagram, the current I is continuously increased within a defined time frame 32 (shown dotted and shaded), which can preferably be pre-set, in order to disconnect the short circuit 30 by initiating a "pinch effect" via the increased current I. It is important to form as little welding spatter as possible while disconnecting the short circuit 30. In order to keep the discharge of spatter resulting from the disconnecting of the short circuit at minimum, the current increase should be set as low as possible, i. e. the current increase di/dt is selected as low as possible in order to create a flat curve of current increase, as can be seen in time frame 32 in the diagram from point of time 31 on. By selecting the current increase too low, however, it is often possible that the short circuit 30 can no longer be disconnected within the defined time frame 32, so it is relatively likely for the welding process to become unstable. This instability may be caused, for example, by a movement of the torch, i. e. an additional immersion of the welding wire 9 into the weld pool, fluctuations in the weld pool, etc.

It is known from the prior art that if the time frame 32 exceeds before the short circuit 30 is disconnected, the current increase speed di/dt remains the same, or the current increase becomes more rapid so that the current I increases faster and the short circuit 30 is broken earlier.

According to the invention, it is now provided for a special method for disconnecting or breaking the short circuit 30 to be performed, wherein after the time frame 32 has exceeded while the short circuit 30 remains, as is the case in FIG. 2 at point of time 33, for example, the current, in particular the welding current, and/or the current profile increases with a current increase time and/or speed di/dt that is higher than the current increase time and/or speed di/dt used in the time frame 32 and that, in particular, rises exponentially in order to disconnect and/or break the short circuit 30, wherein, at the same time, the current increase time and/or speed di/dt is detected and/or observed so that the current increase time and/or speed di/dt at point of time 34, when the short circuit 30 is disconnected, will be stored. As a consequence, the current increase during the next occurring short circuit 30—at point of time 35—is carried out within the time frame 32 according to the most recently saved current increase time and/or speed di/dt, with the current increase time and/or speed di/dt being reset to an initial value according to di/dt of the time frame 32 between points of time 31 and 34 as soon as the short circuit 30 is disconnected within the time frame 32, i. e. at point of time 36.

According to FIG. 2 it is also possible that once the time frame 32 exceeds, from point of time 33 on, the current increase speed is increased progressively up to a specifiable maximum value 37 and is then kept at this maximum value 37 until the breaking of the short circuit 30. An advantage here is that too excessive welding spatter due to a greater current increase is avoided, as the current increase is limited to a certain threshold value and cannot rise infinitely. If this is the case, the maximum current increase speed di/dt will be performed during the next short circuit 30 within the time frame 32. It is of substantial importance for the current increase speed to be modified within the time frame 32 during the following short circuit 30 if a previous short circuit 30 has remained after the exceeding of the time frame 32, i. e. the current increase speed and/or time di/dt of the currently occurring short circuit 30 has to be adapted with regard to the previously completed disconnecting of a short circuit.

In the exemplary embodiment illustrated in FIG. 2 the following time frame 32 is adapted whenever a time frame 32 exceeds, before the current increase speed is reset to the initial value, even if the following time frame 32 exceeds as well after the time frame 32 has exceeded first. Of course it is possible that, after every exceeding, the following values, in particular the current increase speed and/or time di/dt, are modified with regard to the values of the previous short circuit, until a short circuit 30 is disconnected within the time frame 32, whereupon the values or parameters will be reset during the following short circuit 30. This may be done at once, e. in one time frame 32, or over several following time frames 32, with the resetting being completed in one step, i. e. during the next time frame 32, in the exemplary embodiment illustrated.

If, however, according to FIG. 2, a method is used in which a modification takes place in the following time frame 32 after every exceeding of the time frame 32, such approach leads to the parameters, in particular the current increase speed, for a time frame 32 not being reset until a short circuit 30 is disconnected within a time frame 32; otherwise the current increase speed is adapted to the previous parameters in every new time frame 32. As a consequence, the di/dt is increased again for the next short circuit 30, especially the time frame 32, until the duration of the short circuit drops below a specifiable value, in particular within the time frame 32, again. However, the current increase speed within a time frame 32 may also be reduced with regard to a previous time frame 32, since the current increase speed is adapted to point of time 34, the disconnecting of the short circuit 30. In this way, one disconnecting can be done with a higher current increase speed than is the case with the next short circuit 30, so the current increase speed within the time frame 32 may increase or decrease.

FIG. 3 shows an exemplary embodiment, in which the current is no longer limited to a maximum value 37, but maintains a current increase speed 38, that can be pre-set and is to be seen at point of time 39 once it reached this current increase speed 38, with the current I being increased at said speed until the short circuit 30 is broken. If the maximum current increase speed 38 is reached, the current I is increased to the maximum current increase speed 38 once a new short circuit 30 occurs within the time frame 32. If, however, the short circuit 30 is not disconnected within the time frame 32 again, the current increase is always performed at the maximum current increase speed 38 only until the short circuit 30 is broken. Preferably, the values or parameters are modified for the following time frame 32 every time a time frame 32 is exceeded, and are not reset to the pre-set values or parameters until a short circuit 30 is broken within a time frame 32. For the sake of completeness, it should be noted that upon disconnecting the short circuit 30 at a lower di/dt than the possible maximum, the current during the following short circuit 30 is increased with a current increase speed within the time frame 32 which has been detected during the breaking of the previous short circuit 30.

FIG. 4 illustrates a further exemplary embodiment, wherein the resetting of the values or parameters after exceeding a time frame 32 consumes several time frames 32. Here, a short circuit 30 occurs at point of time 40, so that a time frame 32 is started, in which the current I is increased with a current increase speed that may be pre-set, in particular a current increase as flat as possible to avoid welding spatter. As the short circuit 30 has not been disconnected within the defined time frame 32, a rise of the current increase speed and/or a special current profile will follow in order to disconnect the short circuit 30 as quick as possible. The current profile is observed during this in order to detect and adapt the parameters or values for a possible following time frame 32, i. e. another short circuit 30.

As can be seen in FIG. 4, the short circuit 30 breaks at point of time 41, so the current is lowered to the set value, i. e. the welding current, and a normal short-arc welding operation can be continued, with the values or parameters being detected and stored at the disconnecting of the short circuit 30 at point of time 41. At point of time 42, a short circuit 30 occurs again, so that now a modification of the current profile within the time frame 32 for disconnecting the short circuit 30 is made on the basis of the values or parameters of the previous short circuit 30. Preferably, the current increase speed within the currently performed time frame 32 is adapted to the current increase speed while disconnecting the most recent short circuit 30 (point of time 41). It is, however, possible for very different curve shapes, which are stored in a memory, to be used, irrespective of the most recent breaking of a short circuit. Depending on the detected value of the speed of current change during the breaking of the short circuit 30, for example, corresponding curve shapes, percentages and/or values of the detected current increase speed or of a different parameter, etc. may be allocated, and these stored values or parameters might be used for the next time frame 32. For example, the current increase might be performed linearly in one time frame 32, but an exponential current increase might be performed in the next time frame 32, as in the previously performed time frame 32 the short circuit 30 has not been broken within the time frame 32. Therefore, a curve switching may be carried out in the following time frame.

As a multi-stage adaptation is carried out in the illustrated exemplary embodiment according to FIG. 4 and the short circuit 30 is broken within the time frame 32 from point of time 42 on, the most recently stored values or parameters are modified again for a new short circuit, i. e. a decrease of the current increase speed by a certain percentage is performed. That is, if a new short circuit 30 occurs, as can be seen at point of time 43, the time frame 32 is started again with certain values and parameters for the current profile, which have been modified from the previous values or parameters; a flatter current increase speed with respect to the previously performed profile, in particular, is used. In this way, the values are substantially reduced, in particular the current increase speed, with the values or parameters being reset to default values or parameters, for example, in case of another short circuit 30, as can be seen at point of time 44. As a consequence, it can be said that when a time frame 32 is exceeded, the values or parameters are reduced step-by-step over a number of stages, wherein two stages are shown in the illustrated exemplary embodiment, but more stages are possible as well.

A further exemplary embodiment is illustrated in FIG. 5, wherein not the current increase speed is detected and monitored, but a duration 45 when the short circuit 30 is broken, whereupon corresponding modifications will be made in the next time frame 32. Here, a short circuit 30 occurs at point of time 46, leading to the time frame 32 being started and the current being increased linearly with a pre-set current increase speed within the time frame 32 in order to break the short circuit 30. As the short circuit 30 has not been broken at the end of the time frame 32, however, the current is further increased; in particular an exponential or linear rise of the current profile for quickly disconnecting the short circuit 30 is performed. In this case, the duration 45 is monitored and/or detected until the short circuit 30 is broken, i. e. the duration 45 is measured once the time frame 32 has exceeded, and a modification of the values or parameters, in particular the current increase speed, for the next time frame 32 is made according to a stored function, table or values. If a new short circuit 30 occurs, as is the case at point of time 47, the time frame 32 is started, with the values or parameters within the time frame 32 being modified with respect to the pre-set values or parameters. Preferably, an adaptation of the current increase speed by a certain percentage according to the previously exceeded duration 45 is made, as can be seen in time frame 32 from point of time 47 on.

Moreover, it is also possible in the illustrated exemplary embodiment to lower the values or parameters, in particular to lower the current increase speed di/dt. This can be done by a short circuit 30 occurring at a point of time 48, as shown in the embodiment, with the current profile within the time frame 32 being performed with the pre-set values or parameters, wherein now the short circuit 30 is broken before the time frame 32 exceeds. As has already been described above, the duration 45 is detected, so that an exact moment for the disconnecting of the short circuit 30 with respect to the exceeding of the time frame 32 can be determined. Here, it is possible for the remaining time of the duration 45 to be used for the time frame 32 when the short circuit 30 is broken, or for the duration 45 to be detected as well together with the time frame 32 during its start. As a breaking of the short circuit 30 is now performed with the pre-set default values, these values, in particular the current increase speed, are reduced in order to reduce the current profile in the time frame 32 with respect to the current profile in the previous time frame 32 (starting at point of time 48) during the next short circuit 30, to be seen from point of time 49 on.

It is also possible, however, that the current increase speed is modified for the following short circuit 30 depending on the difference between the actual duration of the short circuit and a specifiable intended duration of the short circuit. The di/dt, for example, is increased when a short circuit 30 has a longer duration than a pre-set time span, and/or the di/dt is reduced when a short circuit 30 is shorter than a pre-set time span.

Therefore, in the method used for disconnecting a short circuit 30 during short-arc welding, a time frame 32 is started when a short circuit 30 occurs, within which time frame 32 a defined current profile for breaking the short circuit 30 within the time frame 32 is performed, and on exceeding the time frame 32, an increase of the current is performed, with this current profile for disconnecting the short circuit 30 being detected after the time frame 32 exceeds during a short circuit 30, whereupon at least one value or parameter is stored or saved when the short circuit 30 is disconnected and at least one value or parameter within the time frame 32 of the following short circuit 30 is adapted depending on the stored value or parameter. In the prior art, on the other hand, the current increase is modified to a fixed higher value until the short circuit is broken after a defined duration of a short circuit, i. e. a defined time frame, has exceeded. Afterwards the parameters are reset again, so that when a new short circuit occurs, the breaking procedure is started with the pre-set values, whereas in the solution according to the invention, in the event of a new short circuit, the values are adapted to the previous values when breaking a short circuit, i. e. a modification of the values or parameters of a following time frame 32 is performed in the method for disconnecting a short circuit during short-arc welding if a defined time frame 32 for disconnecting the short circuit 30 is exceeded or too short. No detailed outline of the process states has been given in this connection, as these are already known from the prior art.

The current increase speed may also rise steadily from the start of the short circuit 30, i. e. the start of the time frame 32, in a linear manner or according to any specifiable function, and this may be continued in the same or a modified manner after the time frame 32 has exceeded, wherein, however, based on the breaking moment, modifications may again be made for the next short circuit 30, i. e. the next time frame 32. Moreover, it has to be mentioned that the occurrence of the short circuits 30 is undefined or arbitrary, and the time frame 32 is only started after a short circuit 30 is identified. It is, however, possible for the state of a short circuit to be monitored for a certain time when a short circuit 30 is identified, in order to determine whether it is a "saturated" short circuit 30 or whether only the welding wire 9 has been immersed into the weld pool for a short time. Only after verifying that there is a short circuit 30, the time frame 32 is started and/or continued.

Finally, it should be noted that the exemplary embodiments are intended to merely show possible ways for carrying out the solutions according to the invention, with the invention not being limited to the specifically illustrated embodiments. Combinations of the individual embodiments, in particular, are possible as well, wherein the possibilities for variations are at the discretion of those skilled in the art due to the teachings for technical action of the present invention. The protective scope of the invention further covers all feasible ways of carrying out the invention that implement the solution that the invention is grounded on and that have not been described or illustrated explicitly, or that are possible by combining individual details of the embodiments illustrated and described. Furthermore, the protection covers the individual components of the device according to the invention in so far as they are substantial for implementing the invention in their own right.

The invention claimed is:

1. A method for short arc welding a workpiece using a welding torch to which a welding wire is supplied and being connected to a power source for supplying current to the welding torch, comprising:
    connecting the workpiece to the power source via a welding line;
    creating an arc between the welding wire and workpiece, and moving the wire until a short circuit occurs, and
    disconnecting the short circuit with a control unit, during the step of disconnecting the control unit:
        defining a time frame in which to disconnect the short circuit;
        increasing the current if the time frame is exceeded,
        detecting the current profile that causes disconnection of the short circuit after the time frame expires,
        storing in a memory at least one parameter of the current profile in the disconnection of the short circuit, and
        modifying at least one parameter in the time frame of a following short circuit according to the stored parameter.

2. The method according to claim 1, wherein after the time frame expires during a short circuit, a current increase speed di/dt is increased exponentially with the control unit.

3. The method according to claim 1, further comprising the step of detecting a current increase speed di/dt or a current increase time when disconnecting the short circuit with the control unit.

4. The method according to claim 2, wherein when a time frame is exceeded, the current increase time or current increase speed di/dt is set by the control unit to a most recently saved current increase time or current increase speed di/dt during the following occurring short circuit.

5. The method according to claim 1, wherein when disconnecting the short circuit within the time frame, the parameters for the following short circuit are reset to an initial value by the control unit.

6. The method according to claim 2, wherein when the time frame is exceeded, the current increase speed di/dt is progressively increased by the control unit up to a specifiable maximum value and then kept on this maximum value until the short circuit is disconnected.

7. The method according to claim 2, wherein the current increase speed di/dt of a currently occurring short circuit is modified by the control unit to correlate with the current increase speed di/dt at a previously completed disconnection of a short circuit.

8. The method according to claim 1, wherein when a current increase speed di/dt is pre-set and maintained by the control unit during a time frame until the short circuit is disconnected.

9. The method according to claim 1, wherein a modification of the parameters after a time frame is exceeded is performed over several time frames by the control unit.

10. The method according to claim 1, further comprising the step of detecting a duration when the short circuit breaks and performing modifications to the parameters by the control unit in the next time frame to increase the time frame in which a short circuit breaks.

11. A welding device for short-arc welding, comprising:
    at least one power source;
    a control unit;
    a welding torch connected to the power source and control unit; and
    a line for connecting a workpiece to the power source,
    wherein the power source is configured for creating an arc between a welding wire supplied to the welding torch and workpiece so that a circuit exists between the welding torch and workpiece; and
    wherein the control unit is configured for disconnecting a short circuit when a short circuit occurs, wherein during the disconnection the control unit
        defines a time frame in which to disconnect the short circuit;
        increases the current if the time frame is exceeded,
        detects the current profile that causes disconnection of the short circuit after the time frame expires,
        stores or saves in a memory at least one parameter of the current profile in the disconnection of the short circuit, and modifies the at least one parameter in the time frame of a following short circuit according to the stored value or parameter.

* * * * *